United States Patent
Roberts et al.

(10) Patent No.: US 10,542,801 B2
(45) Date of Patent: Jan. 28, 2020

(54) METHOD OF MANUFACTURING A CASE OF A MOBILE ELECTRONIC DEVICE

(71) Applicant: Tech 21 Licensing Limited, Twickenham (GB)

(72) Inventors: Jason Roberts, Twickenham (GB); Wilhelm Marschall, London (GB); Benjamin Thorpe, London (GB)

(73) Assignee: TECH 21 LICENSING LIMITED, Twickenham (GB)

( * ) Notice: Subject to any disclaimer, the term of this patent is extended or adjusted under 35 U.S.C. 154(b) by 731 days.

(21) Appl. No.: 15/134,024

(22) Filed: Apr. 20, 2016

(65) Prior Publication Data

US 2017/0303653 A1    Oct. 26, 2017

(51) Int. Cl.
*B32B 37/10* (2006.01)
*A45C 11/00* (2006.01)
*B32B 37/00* (2006.01)

(52) U.S. Cl.
CPC ......... *A45C 11/00* (2013.01); *A45C 2011/002* (2013.01); *A45C 2011/003* (2013.01); *B32B 37/025* (2013.01); *Y10T 156/1705* (2015.01)

(58) Field of Classification Search
CPC ............ Y10T 156/1705; B32B 37/025; A45C 2011/002; A45C 2011/003; A45C 11/003
USPC ........................................ 156/230, 233, 239
See application file for complete search history.

(56) References Cited

U.S. PATENT DOCUMENTS

| | | | | |
|---|---|---|---|---|
| 6,086,699 A | * | 7/2000 | Nakashima | B05D 1/28 118/257 |
| 2014/0220270 A1 | * | 8/2014 | Hung | H04M 1/185 428/34.1 |
| 2014/0339130 A1 | * | 11/2014 | Manning | H05K 7/12 206/586 |
| 2015/0097009 A1 | * | 4/2015 | Burgess | A45C 11/00 224/191 |
| 2017/0297315 A1 | * | 10/2017 | Sheu | B32B 7/12 |

* cited by examiner

*Primary Examiner* — Scott W Dodds
(74) *Attorney, Agent, or Firm* — Stephen J. Weyer, Esq.; Stites & Harbison, PLLC

(57) ABSTRACT

A method of manufacturing a case for a mobile electronic device is provided for cases having a generally rectangular shape, two long side walls extending substantially parallel to another, and two short end walls extending substantially parallel to one another between the long side walls. The method includes molding a case portion of a first material of a first hardness forming a substantial portion of the side walls and end walls, and a second material of a second hardness extending around the inner periphery of the first material wherein the first hardness is greater than the second hardness, presenting a strip to an outer periphery of the case portion, applying heat and pressure to a backing layer, and removing the backing strip from which the foil has been removed. The present method is advantageous in that it provides a case with a durable and chemically resistive finish.

13 Claims, 4 Drawing Sheets

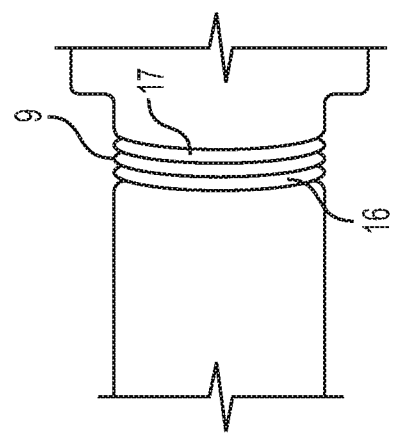
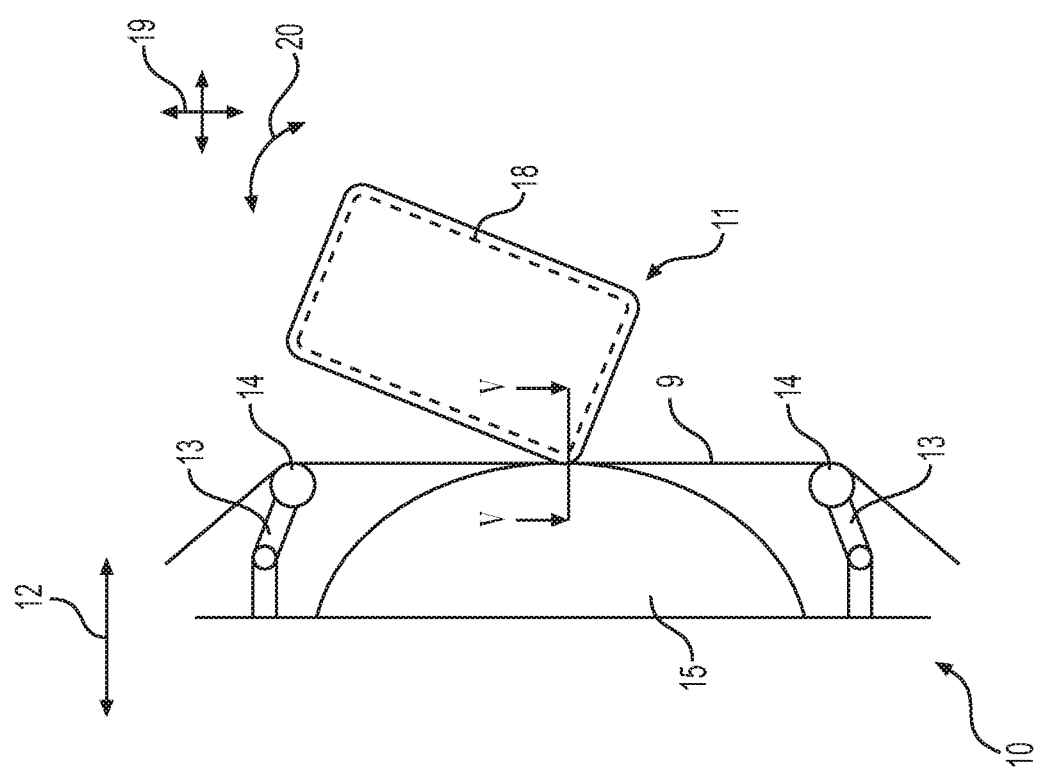

METHOD OF MANUFACTURING A CASE OF A MOBILE ELECTRONIC DEVICE

FIELD OF THE INVENTION

The present invention relates to a method of manufacturing a case for a mobile electronic device. Such devices are commonly known and include smart phones, tablets or e-readers. Typically the screen is a touch sensitive device.

BACKGROUND OF THE INVENTION

There are many cases available for such devices to protect the devices against impact. One such example of a case is the Evo Mesh case produced by the applicant. Such a case is moulded as described in U.S. patent application Ser. No. 14/586,256. Such a case is formed from an inner layer of a viscoelastic material or an impact damping or absorbing polymer which has inwardly projecting ribs with engage with the external periphery of the device. This is surrounded by a harder layer which may be a TPE or TPU providing the rigidity for the case. The above application also contemplates the possibility of an outer layer of a still harder material made of rigid polymer. The present invention is directed to an improvement for such a case.

A number of methods are known for applying patterns, images and textures to such cases. These include painted or electroplated coatings or water transfer printing. Other known processes include in-mould lamination and in-mould decoration. These processes can be used to provide various patterning effects on the external surface of the case. However, they do not provide a durable or chemically resistive finish.

SUMMARY OF INVENTION

According to a first aspect of the present invention, there is provided a method of manufacturing a case for a mobile electronic device with a screen, the case having a generally planar rectangular shape for fitting to the edges of the device and comprising two long side walls extending substantially parallel to another and two short end walls extending substantially parallel to one another between the long side walls; the method comprising:
a. moulding a case portion of a first material of a first hardness forming a substantial portion of the side walls and end walls, and a second material of a second hardness extending around a substantial portion of an inner periphery of the first material, wherein the first hardness is greater than the second hardness;
b. presenting a strip to an outer periphery of the case portion, the strip comprising a foil temporarily affixed to a backing layer, and an adhesive on the side of the foil opposite to the backing strip;
c. applying heat and pressure to the backing layer while pressing the foil against the outer periphery of the case portion thereby activating the adhesive on the foil to cause the foil to adhere to the outer periphery of the case portion; and
d. removing the backing strip from which the foil has been removed.

With this method, a foil layer is applied to the outer periphery of the case. This represents a durable scratch-resistant outer surface which will enhance the performance of the case. Furthermore, the foil process allows the periphery of the device to be formed of materials which are unsuitable for moulding. Thus, the case can be provided, for example, with a "metallic" finish which can be matched to the metallic finish of the mobile electronic device.

The method preferably further comprises applying heat and pressure by a roller which progressively attaches the foil around the periphery of the device. The roller may be moved around the edge of the case portion. However, preferably, the method further comprises moving the periphery of the case portion across the face of the roller. An outer face of the outer periphery of the case portion which receives the foil is preferably convexly curved and preferably has, in cross-section, a radius of curvature of greater than 7 mm and more preferably greater than 10 mm. This presents a relatively flat or completely flat face to the roller thereby facilitating the application of the foil. The roller may have a concave outer face to accommodate any curvature in the outer face of the outer periphery of the case. Alternatively, it may be flat.

It is possible for the foil on the backing strip to be provided with a number of cut-out portions to avoid applying the foil to various features around the frame. However, preferably, the foil is an uncut foil. In this case, an outer face of the outer periphery of the case portion may be provided with at least one recess which is preferably at least 1 mm deep and/or at least one through hole. The method comprises ensuring that the foil is not applied to the recess or across the through hole.

Preferably, after the step of attaching the foil, an insert is inserted into the through hole, the insert being configured to allow a switch on the device to be operated via the insert. By using such an insert, the surface to which the foil is applied is devoid of any raised portions. This means that the foil can readily be applied using the above process in which the only deviations from the continuous run of the foil around the edge of the case are provided by recessed or through hole portions that the foil is configured not to adhere to. This allows a clean edge to be readily produced to which any inserts for operation of the switches can subsequently be applied.

The foil is preferably absent along one of the short end walls other than in the corner regions. This end wall corresponds to the lowest edge of the device where there are commonly numerous ports for headphones, charging plugs and speakers such that the application of the film in this region becomes awkward. In practice, there is relatively little material forming the side wall in this region such that the absence of the foil does not unduly affect the aesthetics of the case.

Preferably, the edge of the recess or through hole where the foil terminates has a radius of curvature of between 0.1 and 0.3 mm.

Preferably, the inner periphery of the second material is provided with inwardly projecting ribs to engage with the edge of the device such that there is substantially no contact between the periphery of the device and the side walls of the case other than via the ribs. This helps to enhance the impact protection.

In addition to the first and second materials of the case portion, the case portion may comprise a third material around an outer periphery of the second material and having a third hardness, the third hardness being greater than the second hardness.

According to a second aspect of the present invention there is provided a case for a mobile electronic device with a screen, the case having a generally planar rectangular shape for fitting to the edges of the device and comprising two long side walls extending substantially parallel to one another and two short end walls extending substantially parallel to one another between the long side walls, the case comprising a first material of a first hardness forming a substantial portion of the side walls and end walls and a second material of a second hardness extending around a substantial portion of the inner periphery of the first material, wherein the first hardness is greater than the second hardness, and a foil strip attached by an adhesive to the outer periphery of the case portion.

The case is preferably manufactured according to the method of the first aspect of the present invention.

BRIEF DESCRIPTION OF THE DRAWINGS

A method and case in accordance with the present invention will now be described with reference to the accompanying drawings, in which:

FIG. 4 is a schematic sketch showing the foil attachment process; and

FIG. 5 is a cross-section through line V-V in FIG. 4.

DETAILED DESCRIPTION

Figure 1:
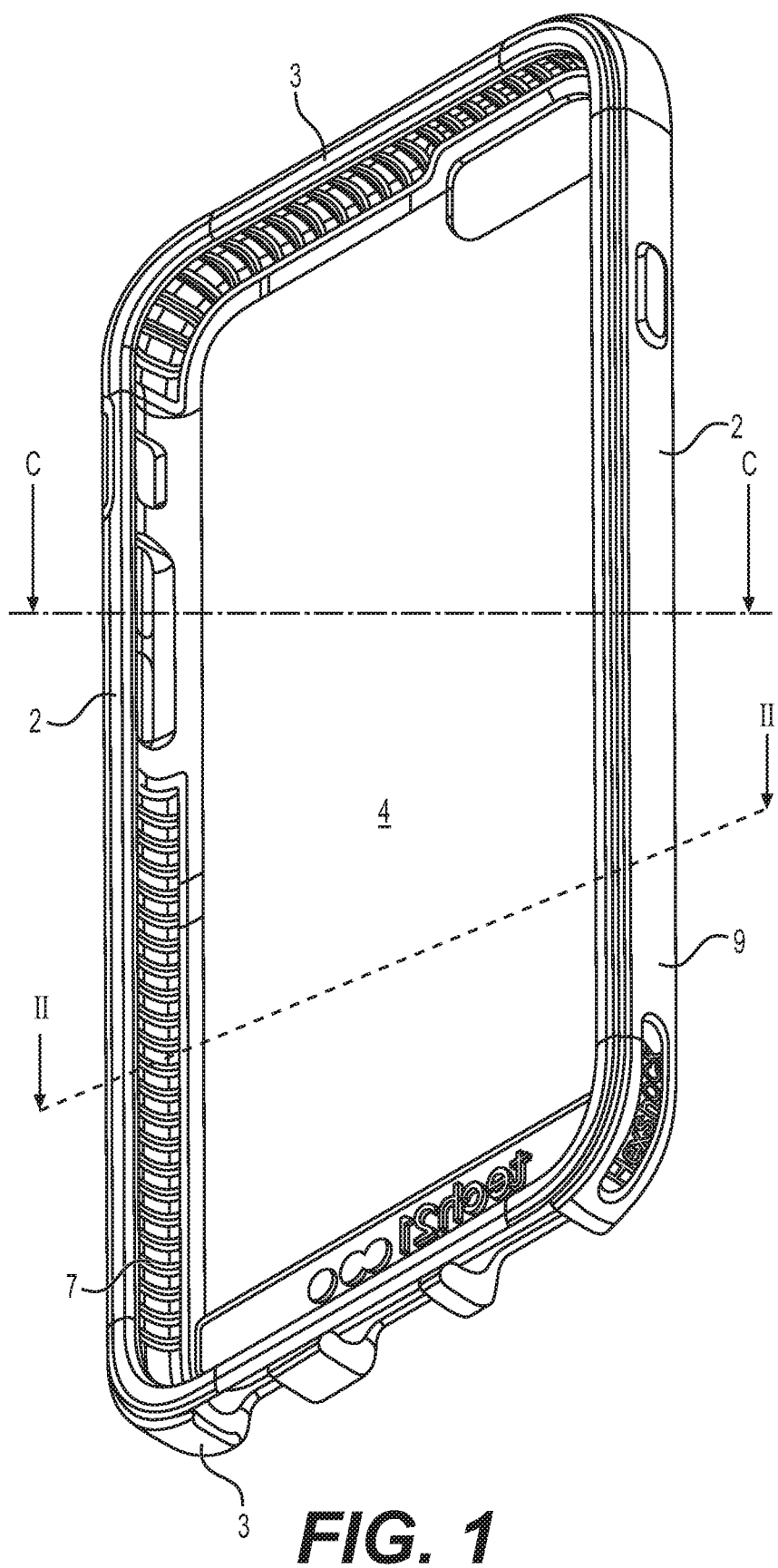
FIG. 1 is a perspective view of a case according to the present invention.

The case shown in the drawings is similar in many respects to the applicant's Evo Mesh phone case disclosed in U.S. patent application Ser. No. 14/586,256, herein incorporated by reference. The case has a five-sided configuration meaning that it has four side walls in the form of two long side walls 2 and two shorter end walls 3. It also has a back 4 forming a fifth side of the case. The invention can also be applied to a four sided case (known as a band) and has broadly the same structure but does not have the back.

Figure 3:
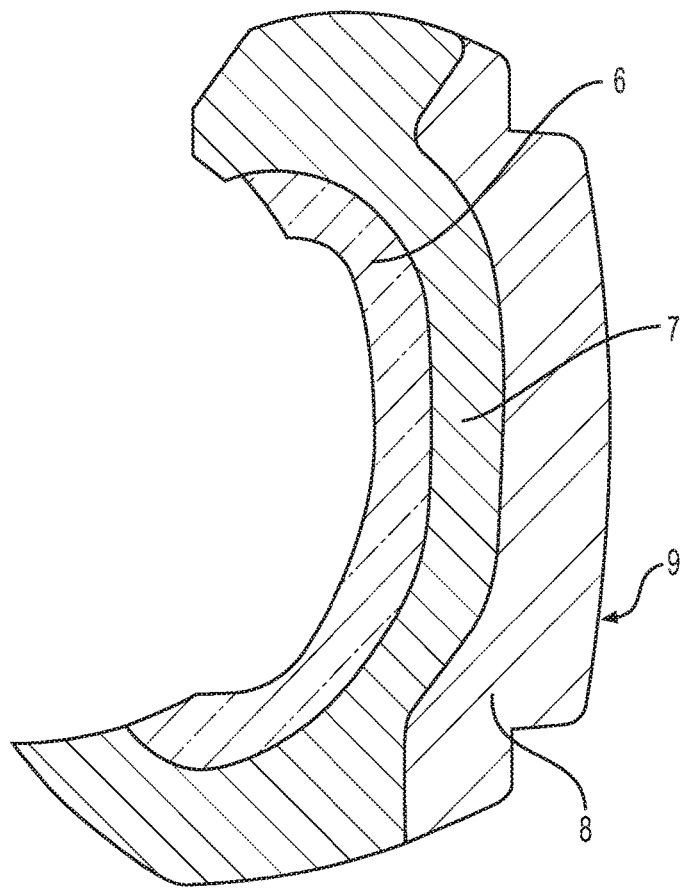
FIG. 3 is an enlarged view of the portion labelled III in FIG. 2.

The layers making up the case are best shown in FIG. 3. These comprise an inner damping layer 6 which is provided with a plurality of inwardly extending ribs 7 as shown in FIG. 1. This is formed of a viscoelastic polymer (for example, a TPE such as Kraiburg Thermoplast K or a PU foam such as BASF Elastoflex). This may also be the FLEXSHOCK™ material of our Evo range of cases. Outside of the damping layer is an intermediate layer 7 which is harder than the damping layer. Hardness is determined in all cases using the Shore A scale. This intermediate layer may be a TPU such as BASF® Elastollan. As will be apparent from FIG. 1, the damping layer 6 extends around those regions of the intermediate layer which are devoid of features in the underlying device such as ports and switches. In the region of the switches and ports, there are either holes or thinner regions in the intermediate layer to allow access to the ports and operation of the buttons. Surrounding the intermediate layer is an outer layer 8 which is effectively a hard outer shell of a PC material such as Bayer Makrolon. All of these materials to date are formed in a single moulding step.

The improvement provided by the present invention is a foil 9 applied to the outer periphery of the walls 2, 3. Foil 9 can be composed of a polymer or plastic with an exterior coating to mimic metal foil. Foil 9 can include metalized and non-metalized foils having different colors as desired.

Figure 6:
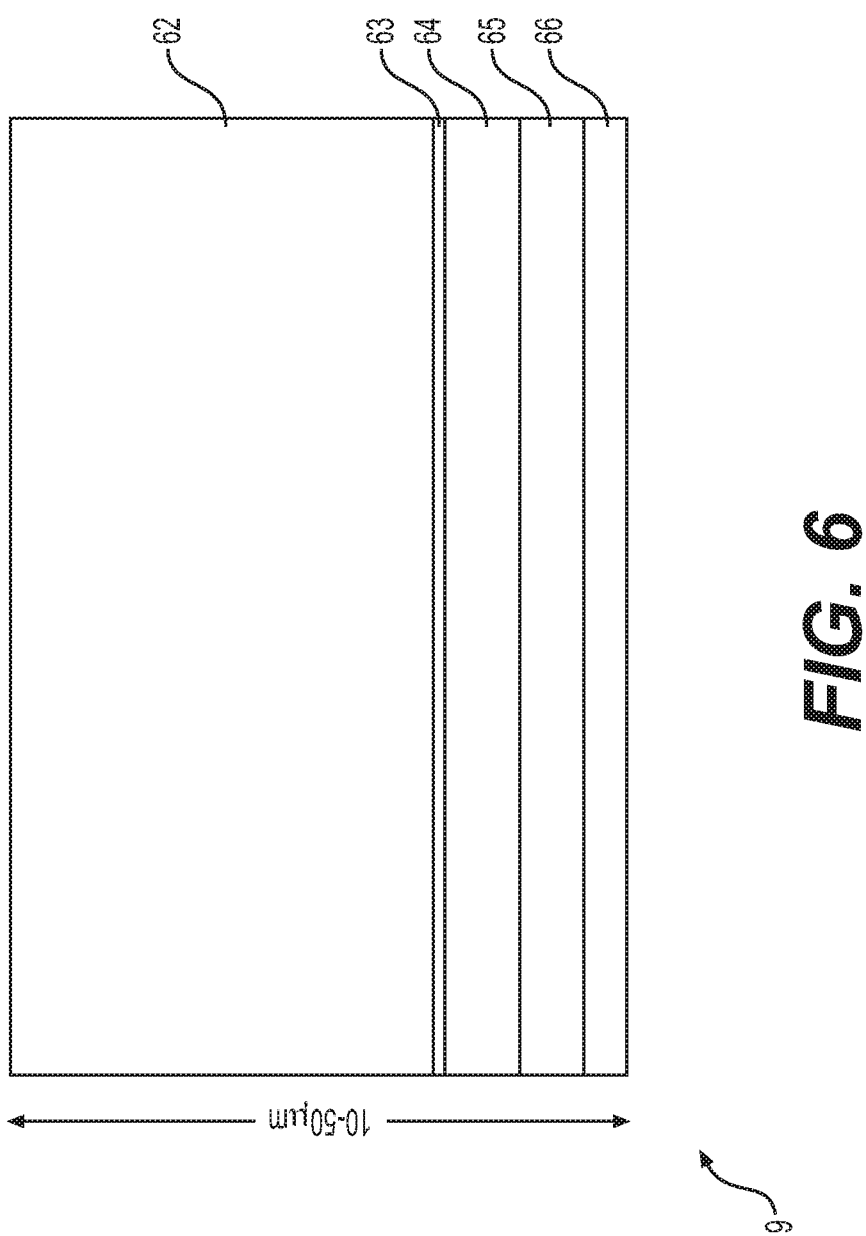
FIG. 6 is a schematic cross-section through the foil in accordance with the present invention.

In one advantageous form, the foil 9 is composed of many layers, best seen in FIG. 6. Foil 9 is composed of ultrathin layers with a total thickness of just 10-50 μm, noting that each of the layers in FIG. 6 are essentially to relative scale to each other. Foil 9 has layers: PET (polyethylene terephthalate) or polyester carrier foil 62, release layer 63, top lacquer layer 64, decorative layer 65, and adhesive layer 66. The PET or polyester carrier layer 62 is the thickest layer with a thickness of 4.5-26 μm. The other layers 63-66 are considerably thinner, e.g. 3-25 μm in total.

In one example, a transparent yellow top lacquer 64 combined with a metallized decorative layer 65 produces a gold colored foil 9. Other possible appearances are possible including pigmented, wood design and various metallic appearances/effects. The adhesive layer 66 is activated by heat during a hot stamping process (described below).

The dimensions of foil 9 can vary depending on effect desired or the dimensions of the cover to which the foil is applied. On average, though, the width used are between 15 mm to 25 mm. In one, preferable, advantageous form, the foil 9 is 15 mm wide to produce lower wastage of the material and reduce cost. However, this has a lower production yield. A thicker 25 mm foil width produces a better production yield, but is more expensive than the 15 mm wide rolls.

Alternatively, the foil can be composed of different material, and have different layers which are suitable for use in accordance with this disclosure and manufacturing process, which are known to one of ordinary skill in the art.

Foil 9 is applied using a hot stamping process as described with reference to FIGS. 4 and 5. The apparatus for applying the foil broadly consists of two components, namely a foil supply mechanism 10 and a case manipulation mechanism 11. The foil supply mechanism 10 is moveable in a lateral direction 12 towards and away from the case manipulation mechanism 11. The foil supply mechanism 10 comprises a pair of arms 13 each of which has a guide roll of 14 around which the foil 9 extends. The rollers 14 hold the foil 9 in front of a roller 15, only a portion of which his shown in FIG. 4.

Figure 2:
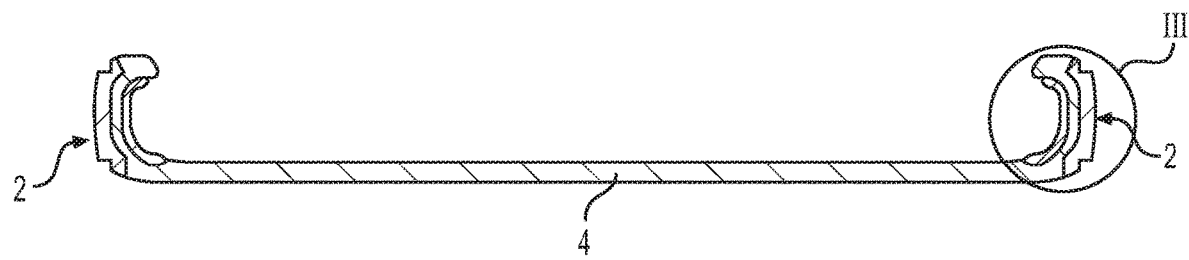
FIG. 2 is a cross-section along line II-II in FIG. 1.

As shown in FIGS. 4 and 5, the foil 9 is provided on a backing layer 16 and is coated on the opposite side with an adhesive 17 as shown in FIG. 5. The case manipulation mechanism 11 is a movable chuck 18 which is able to support the unfinished case in an inverted configuration (i.e. the other way up to the manner in which it is illustrated in FIG. 2). The chuck 18 is moveable in an X-Y plane 19 as well as being rotatable 20.

In use, an unfinished casing is loaded onto the chuck 18 and this is moved towards the roller 15 to present the outermost edge of the outer layer 8 to the foil 9. The chuck 18 is moved towards the roller 15 until the foil 9 is pushed onto the roller 15 into the position shown in FIGS. 4 and 5. The roller 15 is heated and the two mechanisms 10, 11 are pushed together with sufficient pressure that the adhesive 17 is activated and the foil 9 is transferred from the backing sheet 16 onto the periphery of the case. The chuck 18 is translated and rotated such that successive portions of the periphery of the case are brought into contact with the roller as the backing material layer 16 and foil 9 are fed across the rollers 14 such that the film 9 is successively applied around the periphery of the case to generate the finished case.

As shown in FIG. 1, the casing has a number of through holes 20 and 21 which receive inserts 22, 23 respectively which are resiliently mounted to allow buttons on the side of the device to be operated. The inserts 22, 23 protrude beyond the surrounding wall and are fitted in place once the foil step is complete. They may be attached using an adhesive or by any other bonding process. There is also a recess 24 in the wall 2 which is approximately 1.5 mm deep and which surround a through hole 25 through which a mute button on the side of the device can be operated without requiring an insert.

The bottom wall 3 of the case is provided with three large cut-out portions for the headphone port, charging plug and speaker respectively.

The application of the foil has to be able to cope with all of these features in the walls. In order to do this, the foil starts at one end 26 in the bottom wall 3 and terminates at an opposite end 27. Of course, it could start at the end 27 and terminate at the end 26. This means that there are portions 28 and 29 in the wall 3 to which the foil is not applied. However, as is apparent from FIG. 1, these are relatively short portions such that the absence of foil on these regions does not unduly affect the appearance of the case. The foil will only adhere to the portions of the walls 2, 3 that it comes into contact with. Thus, it will not adhere to the through holes 20, 21 or in the vicinity of the recess 24. When the backing material is peeled off, the unadhered portions will remain on the backing material in these regions. The edges of the recesses and through holes in these regions have a radius of curvature of approximately 0.2 mm. This ensures a clean break in the foil but also ensures that the features do not have particularly sharp edges.

One of ordinary skill in the art will recognize that additional embodiments are also possible without departing from the teachings of the presently-disclosed subject matter. This detailed description, and particularly the specific details of the exemplary embodiments disclosed herein, is given primarily for clarity of understanding, and no unnecessary limitations are to be understood therefrom, for modifications will become apparent to those skilled in the art upon reading this disclosure and can be made without departing from the spirit and scope of the presently-disclosed subject matter.

The invention claimed is:

1. A method of manufacturing a case for a mobile electronic device with a screen, the case having a generally planar rectangular shape for fitting to the edges of the device and comprising two long side walls extending substantially parallel to another and two short end walls extending substantially parallel to one another between the long side walls; the method comprising:

moulding a case portion of a first material of a first hardness forming a substantial portion of the side walls and end walls, and a second material of a second hardness extending around a substantial portion of an inner periphery of the first material, wherein the first hardness is greater than the second hardness;

presenting a strip to an outer periphery of the case portion, the strip comprising a foil temporarily affixed to a backing layer, and an adhesive on the side of the foil opposite to the backing layer;

applying heat and pressure to the backing layer using a roller which in turn presses the foil against the outer periphery of the case portion thereby activating the adhesive on the foil to cause the foil to adhere to the outer periphery of the case portion whereby the roller progressively attaches the foil only to the periphery of the case; and removing the backing layer from which the foil has been removed.

2. The method according to claim 1, further comprising moving the periphery of the case portion across the face of the roller.

3. The method according to claim 1, wherein an outer face of the outer periphery of the case portion which received the foil has, in cross-section, a convexly curved profile.

4. The method according to claim 1, wherein an outer face of the outer periphery of the case portion which receives the foil has, in cross-section, a radius of curvature of greater than 7 mm and more preferably greater than 10 mm.

5. The method according to claim 1, wherein the outer face of the outer periphery of the case portion has at least one recess to which the foil is not applied.

6. The method according to claim 5, wherein the recess is at least 1 mm deep.

7. The method according to claim 5, wherein the edge of the recess or through hole where the foil terminates has a radius of curvature of between 0.1 and 0.3 mm.

8. The method according to claim 1, wherein the outer face of the outer periphery of the case portion has at least one through hole to which the foil is not applied.

9. The method according to claim 8, wherein, after the step of attaching the foil, an insert is inserted into the through hole, the insert being configured to allow a switch on the device to be operated via the insert.

10. The method according to claim 8, wherein the edge of the recess or through hole where the foil terminates has a radius of curvature of between 0.1 and 0.3 mm.

11. The method according to claim 1, wherein the foil is absent along one of the short end walls other than in the corner regions.

12. The method according to claim 1, wherein the inner periphery of the second material is provided with inwardly projecting ribs to engage with the edge of the device such that there is substantially no contact between the periphery of the device and the side walls of the case other than via the ribs.

13. The method according to claim 1, wherein the case portion comprises a third material around an outer periphery of the second material and having a third hardness, the third hardness being greater than the second hardness.

* * * * *